(No Model.)

C. POHL & J. LINZ.
APPARATUS FOR UNRAVELING AND WASHING FILTERING MATERIAL.

No. 547,805. Patented Oct. 15, 1895.

Witnesses:
H. K. Boulter
O. T. ———

Inventors:
Carl Pohl,
Johannes Linz
By Wm. E. Poulter, attorney.

UNITED STATES PATENT OFFICE.

CARL POHL AND JOHANNES LINZ, OF PLAUEN, GERMANY.

APPARATUS FOR UNRAVELING AND WASHING FILTERING MATERIAL.

SPECIFICATION forming part of Letters Patent No. 547,805, dated October 15, 1895.

Application filed April 16, 1895. Serial No. 545,955. (No model.)

*To all whom it may concern:*

Be it known that we, CARL POHL and JOHANNES LINZ, subjects of the King of Saxony, residing at Plauen, near Dresden, Saxony, German Empire, have invented certain new and useful Improved Apparatus for Unraveling, Purifying, and Washing Filtering Materials Used in Breweries and the Like, of which the following is a specification.

This invention relates to the unraveling and washing of the materials used for the filtering of beer, wine, and the like in breweries and similar works, for which purpose chiefly cotton fibers, cellulose, and other materials are employed.

Figure 1:
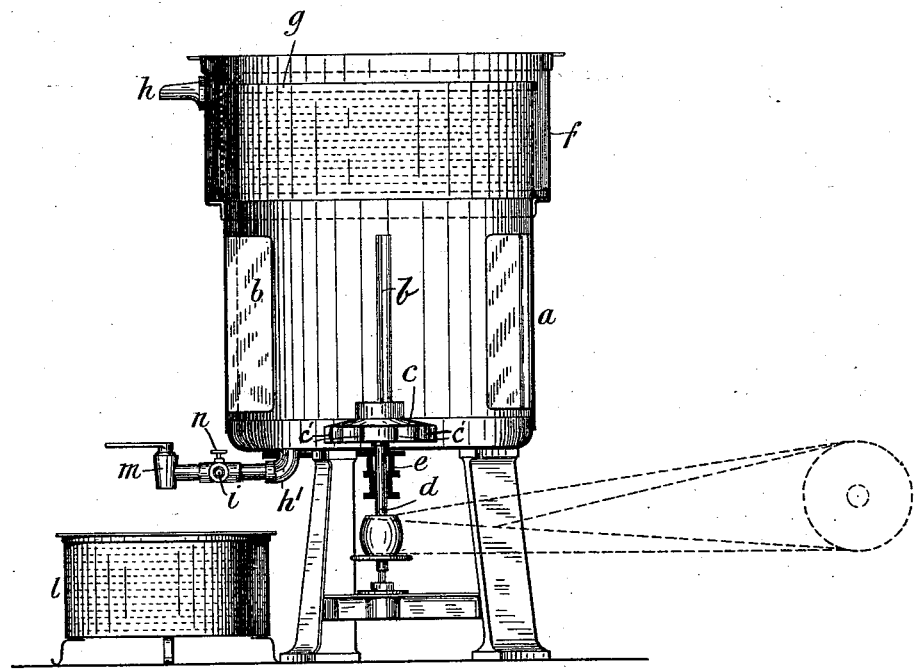
Figure 2:
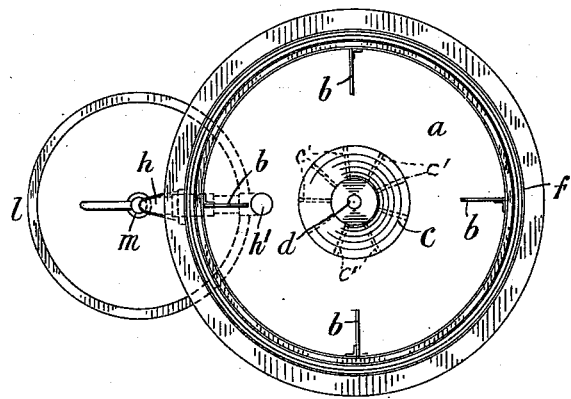

This invention is shown in the accompanying drawings, viz: in Figure 1 in vertical section, and in Fig. 2 in plan, as seen from above.

The apparatus itself consists of a cylindrical receptacle $a$, whereof the inner wall is provided with inwardly-projecting vanes $b$, and on the bottom of which there is a wheel $c$, which is rapidly rotated by a shaft $d$, driven by power from outside and passing through a stuffing-box $e$ in the bottom of the apparatus $a$.

The wheel $c$ may be of any desired construction, though preferably provided with suitable vanes or blades, as $c'$, whereby to violently agitate and drive the water against the inner wall of receptacle $a$.

The upper part of the receptacle $a$ is provided with a crown or cap $f$, in which a cylindrical perforated plate or strainer $g$ is inserted in such manner that between it and the wall of the cap an annular space or channel is left. An overflow-pipe $h$ carries off the dirty water from the cap $f$. A second outlet-pipe $h'$ in the bottom of the apparatus, which can be closed by a cock or tap $m$, allows the unraveled and purified filtering material to be run off into the straining-vessel $l$. Into this pipe $h'$ a pipe $i$ delivers water, which can also be cut off or stopped by a special valve $n$. By means of this pipe $i$ a continuous supply of clean water is led into the receptacle $a$, while the filtering material is undergoing treatment.

By the rapid rotation of the wheel $c$ the filtering material, when introduced into the apparatus full of water, is driven violently against the wall of the receptacle $a$, flows upward, inasmuch as the vanes $b$ prevent the rotation of the mass, and thence sucked inward, toward, and downward, and again thrown outward from the center. This is continually repeated until all the knots are unraveled and driven out of the mass; and it is obvious that by the unraveling or untwisting of these knots in the filtering materials a thorough cleansing thereof is effected, inasmuch as during the centrifugal action, continued until every knot is unraveled, fresh water is continuously being fed to the mass from below, while the dirty water flows off above by the outlet-pipe $h$.

When the water escaping through overflow-pipe $h$ is clear, it indicates that the cleansing operation is completed, and the water entering through pipe $i$ is cut off and cock $m$ turned, to discharge the water remaining in vessel $a$, and the cleansed material to run into strainer $l$, where the water is strained from the said cleansed material, leaving the latter behind ready for further use.

We claim—

1. In an apparatus of the class described the combination with a non-rotating vessel, of radial vanes projecting from the inner wall of the said vessel and adapted to prevent the rotation of the material within the vessel and cause said material to first ascend and then be drawn downwardly, as specified, a shaft journaled in the bottom of the vessel, a wheel mounted upon the shaft within the vessel and adjacent to the bottom of the latter a pipe leading into the bottom of the vessel and having a stop-cock to regulate the discharge of material from the vessel a water pipe communicating with the said pipe whereby water may be fed into the vessel at the bottom thereof, and a sieve at the upper end of the vessel.

2. In an apparatus of the class described the combination with a non-rotating vessel, of radial vanes projecting from the inner wall of the said vessel and adapted to prevent the rotation of the material within the vessel and cause said material to first ascend and then be drawn downwardly as specified, a shaft journaled in the bottom of the vessel, a wheel mounted upon the shaft within the vessel and adjacent to the bottom of the latter a pipe leading into the bottom of the vessel and having a stop-cock to regulate the discharge of material from the vessel, a water pipe communicating with the said pipe whereby water may be fed into the vessel at the bottom thereof, a cylindrical sieve at the upper end of the vessel, and a crown carried by the vessel at its upper end, said crown being of greater diameter than the sieve so as to leave a space between them, and an overflow pipe carried by the upper part of the crown, as specified.

In testimony that we claim the foregoing as our joint invention we have hereunto set our hands in the presence of two witnesses.

CARL POHL.
JOHANNES LINZ.

Witnesses:
HERNANDO DE SOTO,
RUD. SCHMIDT.